United States Patent
Weissman et al.

(10) Patent No.: US 7,107,942 B2
(45) Date of Patent: *Sep. 19, 2006

(54) FUEL COMPOSITION SUPPLY MEANS FOR SPARK IGNITION ENGINES

(75) Inventors: Walter Weissman, Basking Ridge, NJ (US); Randall D. Partridge, Califon, NJ (US); Bhupender S. Minhas, Bridgewater, NJ (US); Guido Sartori, Milan (IT); Takanori Ueda, Shizuoka (JP); Yoshihiro Iwashita, Mishima (JP); Kazuhiro Akihama, Aichi (JP); Satoshi Yamazaki, Aichi-gun (JP)

(73) Assignees: ExxonMobil Research and Engineering Company, Annandale, NJ (US); Toyota Jidosha Kabushiki Kaisha, Toyota (JP)

( * ) Notice: Subject to any disclaimer, the term of this patent is extended or adjusted under 35 U.S.C. 154(b) by 144 days.

This patent is subject to a terminal disclaimer.

(21) Appl. No.: 10/729,451

(22) Filed: Dec. 5, 2003

(65) Prior Publication Data

US 2005/0056264 A1    Mar. 17, 2005

Related U.S. Application Data

(63) Continuation-in-part of application No. 10/616,216, filed on Jul. 8, 2003, now abandoned.

(51) Int. Cl.
F02B 13/00 (2006.01)

(52) U.S. Cl. .................... 123/1 A; 123/575

(58) Field of Classification Search ............... 123/1 A, 123/582, 525, 575, 577
See application file for complete search history.

(56) References Cited

U.S. PATENT DOCUMENTS

| | | | | |
|---|---|---|---|---|
| 4,370,150 A * | 1/1983 | Fenstermaker | ................ | 95/49 |
| 4,565,548 A * | 1/1986 | Davis et al. | ................ | 44/302 |
| 4,743,273 A * | 5/1988 | Croudace et al. | ............ | 44/418 |
| 5,653,866 A * | 8/1997 | Jessup et al. | ................ | 208/46 |
| 6,161,386 A * | 12/2000 | Lokhandwala | .............. | 60/649 |
| 6,318,306 B1 * | 11/2001 | Komatsu | .................... | 123/3 |
| 6,332,448 B1 * | 12/2001 | Ilyama et al. | ............... | 123/304 |
| 6,622,663 B1 * | 9/2003 | Weissman et al. | .......... | 123/1 A |
| 6,711,893 B1 * | 3/2004 | Ueda et al. | .................. | 60/285 |

\* cited by examiner

Primary Examiner—Noah P. Kamen
Assistant Examiner—Jason Benton
(74) Attorney, Agent, or Firm—Paul E. Purwin

(57) ABSTRACT

A fuel system for on-board vehicle fuel separation to supply engine fuel compositions formulated as a function of driving cycle conditions. The invention results in improvements in one or more of feed efficiency and combustion emissions.

11 Claims, 2 Drawing Sheets

FUEL COMPOSITION SUPPLY MEANS FOR SPARK IGNITION ENGINES

This application is a Continuation-In-Part of U.S. Ser. No. 10/616,216 filed Jul. 8, 2003 now abandoned which is based on U.S. Ser. No. 09/818,203 filed Mar. 27, 2001.

FIELD OF INVENTION

The present invention relates generally to a means for supplying engine fuel compositions and their use in spark ignition, internal combustion engines especially those having a compression ratio (CR) of 11 or more. The engine fuel supply is tailored to meet the engine's drive cycle conditions, including load and speed.

BACKGROUND OF INVENTION

Both petroleum refineries and engine manufacturers are constantly faced with the challenge of continually improving their products to meet increasingly severe governmental efficiency and emission requirements, and consumers' desires for enhanced performance. For example, in producing a fuel suitable for use in an internal combustion engine, petroleum producers blend a plurality of hydrocarbon containing streams to produce a product that will meet governmental combustion emission regulations and the engine manufacturers performance fuel criteria, such as research octane number (RON). Similarly, engine manufacturers conventionally design spark ignition type internal combustion engines around the properties of the fuel. For example, engine manufacturers endeavor to inhibit to the maximum extent possible the phenomenon of auto-ignition, which typically results in knocking and, potentially engine damage, when a fuel with insufficient knock-resistance is combusted in the engine.

Under typical driving situations, engines operate under a wide range of conditions depending on many factors including ambient conditions (air temperature, humidity, etc.), vehicle load, speed, rate of acceleration, and the like. Engine manufacturers and fuel blenders have to design products that perform well under virtually all such diverse conditions. This requires compromise, as often times fuel properties or engine parameters that are desirable under certain speed/load conditions prove detrimental to overall performance at other speed/load conditions. Conventionally, vehicular fuels are supplied in two or three grades, typically distinguished by their RON. Generally, the selection of fuel grade is based upon the engine specifications. However, once the fuel is "on board", it becomes a "one fuel fits all" and must be designed to accommodate diverse speed, load and other driving conditions.

One object of this invention is to employ a fuel supply system using a membrane for segregating octane boosting constituents from a main fuel tank or reservoir, that are selectively admixed or run separately to the engine fuel supply in response to engine drive cycle conditions.

Another object of this invention to establish a procedure for providing an engine with fuels specifically designed to enhance engine performance at low and high load engine conditions from a single fuel delivered to the vehicle.

Also, spark ignition engines are generally designed to operate at a compression ratio (CR) of 10:1 or lower to prevent knocking at high load. Compression Ratio (CR) is defined as the volume of the cylinder and combustion chamber when the piston is at Bottom Dead Center (BDC) divided by the volume when the piston is at Top Dead Center (TDC). As is known, higher CRs, up to about 18:1, are optimum from the standpoint of maximizing the engine thermal efficiency across the load range. A higher CR leads to greater thermal efficiency by maximizing the work obtainable from the theoretical Otto (engine compression/expansion) cycle. Higher CRs also lead to increased burn rates, giving a further improvement in thermal efficiency by creating a closer approach to this ideal Otto cycle. Operation at high compression, however, is limited by insufficiently high fuel octane, as in practice it is difficult to supply a single fuel with sufficiently high octane overall to allow for a significant increase in compression ratio without having engine knocking at high loads.

Therefore, another objective of this invention is to facilitate the use of high compression ratio engines that realize greater thermal efficiency across the entire driving cycle without the problem of knocking at high load by supplying a specifically formulated fuel derived from the fuel supplied to the vehicle.

In theory, higher efficiency engine operation at certain moderate to high loads can be achieved by adjusting the spark ignition timing closer to the value that provides spark advance for best torque known as maximum brake torque ("MBT"). Experience has shown, however, that adjusting the ignition timing to allow MBT to be reached is not always practical since knocking typically occurs under conditions of moderate to high load at timings earlier than MBT with commercially available gasoline. In principle, operating with a very high octane fuel would allow running the engine at MBT across the drive cycle. However, a preferred approach is to supply the engine with a fuel that has sufficient octane to approach or operate at MBT without knocking over a wide range of load and speed conditions. The fuel supply system taught herein separates or extracts constituents of the supply fuel that have or can impart sufficient octane to approach or operate at MBT under moderate to high engine load and speed conditions.

Yet another object of the invention is to provide fuel compositions that allow adjusting the spark ignition timing closer to that which provides MBT over a wider range of load and speed conditions.

Present spark ignition engines are capable of operating with known fuels at a normalized fuel to air ratio ("$\phi$") below 1.0 under low to moderate load conditions. The normalized fuel to air ratio is the actual fuel to air ratio divided by the stoichiometric fuel to air ratio. In addition, these engines can be operated with exhaust gas recycle (EGR), as the "leaning out" diluent, at a $\phi$ of 1.0 or lower. EGR is understood to include both recycled exhaust gases as well as residual combustion gases. An obstacle to operating the engine under such lean conditions is the difficulty of establishing a rapid and complete burn of the fuel.

Another object of this invention therefore is to provide a lower octane, lower autoignition resistant, high burn rate fuel for use under lean conditions. As known in the art, autoignition of the fuel at sufficiently high loads can pose a threat of mechanical damage to the engine, i.e., knocking. However, at certain low load conditions, for example lean stratified operation, autoignition of the fuel can be beneficial to overall engine operation by optimizing burn characteristics that result in a more complete burn or combustion, and thereby reduced engine emissions and higher efficiency.

The membrane separation or segregation process entails contacting a surface of the membrane with the feed material. Membrane composition is selected to permeate specific constituents of the feed. Those constituents dissolve onto and into the membrane surface region. These constituents then diffuse or migrate to the opposite surface of the membrane. There, the high octane constituents are recovered as permeate.

Other objects of the invention and their attendant advantages will be apparent from the reading of this specification.

SUMMARY OF INVENTION

One aspect of the invention is a system for separating or segregating fuel constituents from the primary fuel tank of a vehicle to supply particularly formulated fuel to meet engine needs under varying drive cycle conditions. An objective of the invention is the provision of a plurality of unleaded fuel compositions separated or segregated from a single fuel supply or reservoir, for use in operating a spark ignition, internal combustion engine, especially an engine having a CR of 11 or more. Each of the compositions have different predetermined combustion properties suitable for use under preselected engine operating conditions to improve one or more of fuel efficiency and combustion emissions. The invention uses a membrane to separate an aromatics rich fuel from the fuel contained in the primary tank or reservoir. The membrane functions to preferentially separate aromatic permeate from the remaining retentate. The high aromatic content permeate provides a source of increased RON fuel that is selectively admixed or run separately to the engine fuel supply at high and moderate engine load conditions.

In one embodiment a pervaporation membrane process is employed to segregate at least a first and second fuel composition from a single fuel tank, the first fuel having combustion properties sufficient to improve combustion thereof (relative to the original tank fuel) under high and moderate engine load conditions and the second fuel having combustion properties sufficient to operate the engine under low engine load conditions.

The pervaporation process, as generally known in the art, relies upon vacuum on the permeate side of the membrane to evaporate the permeate from the surface of the membrane. The vapor phase permeate may then be condensed to liquid form.

Especially preferred fuels for use under low load conditions are those unleaded fuels boiling in the gasoline boiling range that have a RON less than about 90, and preferably a burn rate greater than 105% of isooctane at the low end of the cycle measured at a temperature and pressure representative of conditions in the engine at the low end of the load scale.

Especially preferred fuels for use under high load conditions are those unleaded fuels boiling in the gasoline boiling range that have a RON greater than 98 and preferably greater than 100 and an average burn rate in the engine, defined as 1/crank angles for 90% burn completion, >105% of isooctane at this time in the cycle measured at a temperature and pressure representative of conditions engine at or about this time in the engine operating cycle.

In view of the foregoing it will be readily appreciated that a wide range of modifications and variations of the invention are within the broad aspects set forth above and the unique scope of the invention will become even more apparent upon a reading of the detailed description which follows.

DETAILED DESCRIPTION OF INVENTION

Figure 1:
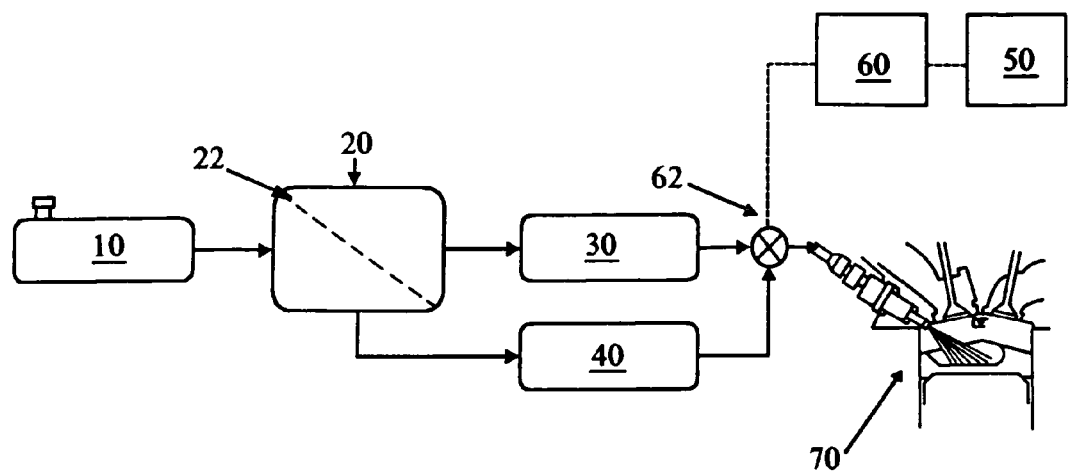
FIG. 1 illustrates a fuel separation system of the invention.

As is well known in the art, gasoline fuels generally are composed of a mixture of hydrocarbons boiling at atmospheric pressure in the range of about 77° F. (25° C.) to about 437° F. (225° C.). Typically gasoline fuels comprise a major amount of a mixture of paraffins, cycloparaffins, olefins and aromatics, and lesser, or minor amounts of additives including oxygenates, detergents, dyes, corrosion inhibitors and the like. Typically also, gasoline fuels are formulated to have a RON of about 98 for premium grade and about 92 for regular grade and are used alone in a vehicle engine, the grade used normally depending upon the vehicle manufacturer's recommendation.

The present invention departs form the practice of formulating a single fuel for a specific vehicle engine. Indeed, the present invention is based on the discovery that significant benefits can be achieved by providing a range of fuel compositions having combustion properties tailored to the engine's specific operating condition, and the means to supply the particularly formulated fuel composition with the vehicle having a single supply fuel.

The fuel compositions of the invention are unleaded fuels boiling in the gasoline range and capable of being used in port or direct fuel injection, spark ignition, internal combustion engines especially those having a CR of 11 or higher.

In one embodiment the fuel compositions will comprise at least one first fuel and a second fuel. The first fuel will have a RON greater than 98 and preferably greater than 100, and preferably a burn rate greater than 105% of isooctane at the high load end of the cycle measured at a temperature and pressure representative of conditions in the engine at the high end of the load scale. The second fuel will have a RON less than 90, and preferably a burn rate greater than 105% of isooctane at the low end of the cycle measured at a temperature and pressure representative of conditions in the engine at the low end of the load scale.

A particularly useful unleaded first fuel for operating the engine in the high load portion of the drive cycle comprises a mixture of hydrocarbons boiling in the gasoline range with an RON greater than about 98 and having an aromatics content, expressed herein as volume %, greater than about 45 vol % aromatics, preferably greater than about 60 vol % aromatics content.

A particularly useful unleaded second fuel for operating the engine in the low load portion of the drive cycle comprises a mixture of hydrocarbons boiling in the gasoline range having an RON less than about one research octane number below that of the feed or supply fuel and containing less aromatics than the first fuel. In one embodiment, the second fuel contains less than about 45 vol % aromatics preferably less than about 20 vol %, and most preferably less than about 10 vol %. Expressed alternatively, the second fuel has an aromatic content less than the feed or supply fuel, and preferably less than about 80% of the aromatic content of the feed or supply fuel where the feed or supply fuel has an initial aromatic content that ranges from about 15 vol % to about 45 vol %.

Fuels meeting the foregoing characteristics provide efficiency benefits for various types of spark ignited internal combustion engines when operating under high load conditions. High load conditions are defined as being those regions of the engine operating map where at MBT spark timing knocking occurs with a gasoline of RON 98. Knocking is defined as autoignition under sufficiently severe in-cylinder conditions that it results in a detonation that poses a risk of mechanical damage to the engine.

In the case of spark ignition engines, use of fuels having the properties of the first fuel above permits the engine to be designed to operate at a CR of 11 or more and permits advance spark timing closer to that for MBT. These design features enhance overall cycle efficiency, i.e., provide improved fuel economy.

More particularly these benefits are achieved with direct fuel injection engines and especially direct injection, lean burn engine systems, such as stratified charge direct injection systems. Stratified charge is an in-cylinder condition wherein there is an inhomogeneous air:fuel ratio distribution. As is known, "lean burn" engines operate under low load conditions at normalized fuel to air ratios ("φ") of below 1.0 with or without exhaust gas recycle, or at a φ of 1.0 or lower with exhaust gas recycle as a leaning out diluent.

Fuels having the combustion properties of the second fuel above are suitable for use especially in the operation of spark ignition engines, including stratified fuel systems, operating under low load conditions with exhaust gas recycle. Low engine load conditions are those regions of the engine operating map at or below which the engine can be operated at or near MBT timing with a fuel having a RON of approximately 90 without the condition of knocking as defined above.

Fuels having a range of combustion properties between the first and second fuel offer even more complete tuning of the fuel compositions to engine operating conditions. Indeed, a third fuel composition can be provided having a RON between those of the first and second fuel, and most desirably a burn rate greater than 105% of isooctane at the medium load end of the cycle measured at a temperature and pressure representative of conditions in the engine at the medium end of the load scale. Such a fuel can be used under moderate engine load conditions, i.e., conditions between high and low load conditions.

The aromatics content of the first and second fuel, previously described in ranges of vol %, may also be expressed relative to the aromatics content of a supply or feed fuel. Typical gasoline fuels have aromatic content ranging from about 15 vol % to about 45 vol %. One aspect of the present invention is the suitability of the membrane system to selectively permeate aromatics. The membrane system's ability to selectively permeate aromatics, as determined relative to the aromatic content of the feed or supply fuel, is referred to herein as an "aromatics selectivity factor," or "ASF." The membrane system of the present invention exhibits an ASF defined by the relation:

$$\frac{\text{First Fuel Volume \% Aromatics}}{\text{Volume \% Non-Aromatics}} = ASF \cdot \frac{\text{Feed Fuel Vol \% Aromatics}}{\text{Vol \% Non-Aromatics}}$$

To provide adequate aromatic selectivity, the membrane system of the present invention has an ASF that ranges from about 1.2 to about 8.5. Table 1 below illustrates this aspect of the invention.

on-board fuel supply, then feeding separately or selectively admixing the relatively high RON/octane fuel to the regular engine fuel supply responsive to engine drive cycle conditions. This is best illustrated by reference to the figures.

FIG. 1 depicts an on-board fuel separation system, as taught in the present invention. In FIG. 1, fuel tank 10 serves as a primary fuel supply source. Conventionally, fuel tank 10 stores and supplies gasoline, where RON may range from 90 for "regular" grade fuel, to 98 for premium grade fuel. Fuel is supplied from the fuel tank 10 to the membrane apparatus 20. The membrane material, illustrated by 22, is chosen to selectively permeate relatively high RON and octane constituents of gasoline, including for example those constituents of gasoline ordinarily referred to as "aromatics". The permeate constituents segregated by the membrane apparatus 20 are supplied to a high octane accumulator, while the retentate is supplied to a low octane accumulator 40. In accordance with one aspect of this invention, engine drive cycle conditions including load (measured in torque), speed (measured in revolutions per minute), spark advance (measured in degrees before or after top dead center, i.e., BTDC or ATDC), intake manifold and exhaust manifold temperature and pressure, knock sensor response, and other engine during cycle conditions are monitored by sensing means depicted by 50. An admix controller 60, responsive to the engine drive cycle conditions, selectively operates a mixing valve 62 to admix fuel from the high and low octane accumulators. The admixed fuel is supplied to an engine fuel injection system depicted at 70. Alternatively the high and low octane streams can be provided through separate injectors to each cylinder.

The invention employs a membrane pervaporation process and particularly selected membrane to segregate high-octane fuel constituents from primary fuel. Accordingly, membrane 22 is selected from membrane materials to include the following preferable characteristics:
 i. permeance to selected constituents of gasoline, particular those having RON and octane boosting properties (e.g. aromatics)
 ii. capable of withstanding temperatures as high as 250° C.
 iii. capable of withstanding pressure differentials, when supported, as great as 200 bar.

Suitable membranes include preferably copolymers comprising diepoxide crosslinked/esterified polyimide-aliphatic polyester copolymers such as polyimide/polyadipate/polyimide/polysuccinate, polyimide/polymalonate, polyimide/polyoxalate and polyimide/polyglutarate and supported composite based membranes using these or appropriate other selective layers; and a variety of other polymeric structures, both crosslinked and uncrosslinked including cellulosic materials such as cellulose tri-acetate, poly(vinyl pyrrolidone), poly(2,6,-dimethyl-1,4,-phenylene ether), poly (alkylene terephthalates), poly(aryl ether ketone amide)s, poly(aryl ether ketone)s, poly (aryl ether sulfone)s, poly

TABLE 1

| Feed Fuel Aromatic Content (Vol %) | 15 | 15 | 15 | 45 | 45 | 45 | 45 | 30 | 30 | 30 | 30 |
|---|---|---|---|---|---|---|---|---|---|---|---|
| First Fuel or Permeate Aromatic Content (Vol %) | 45 | 50 | 60 | 50 | 60 | 80 | 87 | 50 | 60 | 70 | 79 |
| ASF | 4.65 | 5.7 | 8.5 | 1.22 | 1.83 | 4.89 | 8.5 | 2.33 | 3.5 | 5.44 | 8.55 |

The above described fuels are supplied by a fuel system that utilizes a membrane and a pervaporation process to segregate RON and octane boosting constituents from an (aryl ether)s, poly(ether ester ketone), poly(ether imide), poly(phenylene sulfide), poly(ester)s, poly(amide)s, poly (imide)s, polyarylates, polymethylacrylates, polyolefins, polycarbonates, polycycloolefins, polyester-based thermoplastic elastomers, polyethers, polyacrylonitrile and acrylonitrile copolymers, polystyrene and styrene copolymers, thermoplastic elastomers, polyester block copolymers, polyamide block copolymers, polyimide block copolymers, polyurethanes and polyurethane block copolymers, thermoplastic polyolefins, thermoplastic vulcanizates, polybenzimidazole, polyketones, ionomers, and supported composite based membranes using these as selective layers. These membranes may be supported.

Figure 2:
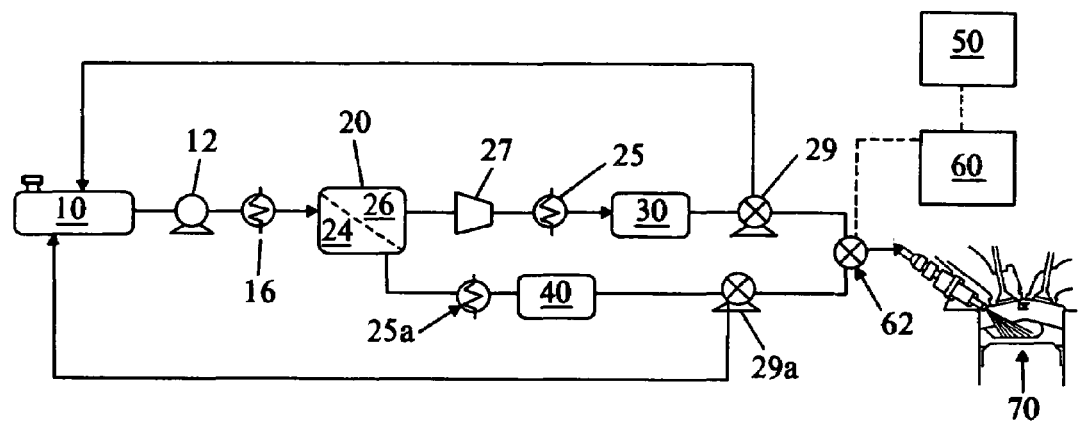
FIG. 2 illustrates a membrane fuel separation system of the invention.

Referring to FIG. 2, there is schematically shown a more detailed description of the separation system of this invention for supplying two or more fuels having specifically formulated properties. In FIG. 2, fuel tank 10 stores and supplies conventional fuel such as gasoline. A fuel pump 12 may be used to pump at increased pressure to the membrane apparatus 20. As detailed hereinafter, operation of membrane 22 may be improved by pressurization of the fuel contacting the membrane on the retentate side, here shown at 24. Accordingly, fuel pump 12 may be utilized to supply pressurized fuel to the membrane apparatus 20 at pressures ranging from about 1.5 to 20 bar and preferably from about 2 to 10 bar. A flow control means 14 may be used to control or regulate the fuel flow from the fuel tank 10 to the membrane apparatus 20.

As further detailed below, the functioning of membrane 22 is influenced by the temperature of the membrane, which may be preferentially heated to improve or control the permeation rate through the membrane. Therefore, in a preferred embodiment a heater 16 is provided to heat the fuel and membrane apparatus 20 providing sufficient sensible heat to maintain the membrane at the desired outlet temperature, while providing the heat need for vaporization of the permeate.

Retentate 24 from the membrane apparatus 20 may be cooled by means of a heat exchanger 25a. Cooling of the retentate 24 may be advantageously made by heat exchange against the ambient fuel 10 flowing to the heater 16. This also serves to preheat the fuel to the heater 16. As stated above, the pervaporation process preferably utilizes a vacuum on the permeate side of the membrane, here shown as 26, to help drive the membrane process. Accordingly, a vacuum pump 27 and optimal vacuum pump regulator valve 28 may be used to provide a vacuum to the permeate side of the membrane, here shown as 26. The vacuum maintained on the permeate side of the membrane may range from about 0.05 bar to about 0.9 bar, preferably from about 0.05 bar to about 0.5 bar.

In one embodiment, membrane 22 comprises a diepoxide crosslinked/esterified polyimide/polyadipate membrane selected to preferentially permeate aromatic constituents of gasoline. The gasoline, comprising conventional "regular grade" 90–92 RON having less than or equal to about 35% aromatic content, is separated into a first high octane/RON fuel having up to about sixty-five percent (65%) aromatic content and a RON in excess of about 98 RON. The second or retentate fuel has a RON ranging from about 85 to about 92. Accordingly, in one embodiment, high octane accumulator 30 is supplied high octane fuel having a RON greater than about 100, whereas low octane accumulator 20 is supplied low octane fuel ranging from about 85 to about 92 RON.

The permeate from membrane 26 is vaporized upon departing the membrane 22. To return the vapor permeate to a liquid form, condensing means 29 may comprise a cooling device such as a compact heat exchanger using ambient air as the cooling media. The permeate, now in predominately liquid form, is supplied to the high octane accumulator 30. A pump means control valve 29 may be utilized to supply the condensed permeate fuel to the high octane accumulator. A fill sensing device 31 (not shown in the Figure) may be used to identify when the high octane accumulator is filled, and function to either reduce the volume of permeate through the membrane, return amounts of the high octane permeate to the fuel tank 10 or a combination thereof.

The retentate low RON fuel leaving the membrane apparatus 20 is supplied to the low RON accumulator 40.

As described above, the high RON fuel is fed separately or admixed to the low RON fuel at 62 whenever engine drive cycle needs require fuel whose RON or octane requirements are higher than that supplied by the second or retentate fuel from low RON accumulator 40.

EXAMPLE 1

A "regular" grade fuel having a research octane number of 89.8 and aromatic content of about 25.3 vol % was used as a feed for the membrane system. Accumulated permeate from the membrane was analyzed as having a research octane number of 98.8, an average burn rate of about 106% relative to isooctane at 2000 RPMs, about 104% at 4000 RPMs, and an aromatics content of about 61.4%. The permeate fuel was used in a test engine having a 13:1 compression ratio and compared to conventional commercial fuel having a RON of 91.7. When operating at wide open throttle with the spark advance limited by trace knock the permeate fuel in comparison to the conventional fuel gave a torque output of 172 newton-meters versus 156 newton-meters at 2000 rpm and 194 newton-meters versus 173 newton-meters at 4000 rpm. The retenate fuel was analyzed as having a RON of 88, and aromatics content of about 20 vol %.

The invention claimed is:

1. A fuel system for supplying a plurality of fuels boiling in the gasoline range for use in a spark ignition, internal combustion engine comprising a fuel supply, a membrane in operable communication with the fuel supply for separating said fuel supply into at least a first fuel, said first fuel having a RON greater than about 98 and an aromatics content greater than about 45 vol % and a second fuel.

2. The fuel system of claim 1 wherein said second fuel has a burn rate greater than isooctane, an aromatics content of less than about 45%, and a RON less than about one RON below the supply fuel.

3. The fuel system of claim 2, further characterized as having means for supplying the second fuel to the engine at low load conditions and means for supplying the first fuel to the engine at other than low load conditions.

4. The fuel system of claim 3 wherein said membrane is diepoxide crosslinked/esterified polyimide-aliphatic polyester copolymers or uncrosslinked copolymers, or cellulosic materials, selected from the group consising of polyimide/polyadipate/polyimide/polysuccinate, polyimide/polymalonate, polyimide/polyoxalate and polyimide/polyglutarate, cellulose tri-acetate, poly(vinyl pyrrolidone), poly(2,6,-dimethyl-1,4,-phenylene ether), poly(alkylene terephthalates), poly(aryl ether ketone amide)s, poly(aryl ether ketone)s, poly (aryl ether sulfone)s, poly (aryl ether)s, poly(ether ester ketone), poly(ether imide), poly(phenylene sulfide), poly (ester)s, poly(amide)s, poly(imide)s, polyarylates, polymethylacrylates, polyolefins, polycarbonates, polycycloolefins, polyester-based thermoplastic elastomers, polyethers, polyacrylonitrile and acrylonitrile copolymers, polystyrene and styrene copolymers, thermoplastic elastomers, polyester block copolymers, polyamide block copolymers, polyimide block copolymers, polyurethanes and polyurethane block copolymers, thermoplastic polyolefins, thermoplastic vulcanizates, polybenzimidazole, polyketones, ionomers and composites thereof.

5. The fuel system of claim 4 wherein the membrane is supported.

6. The fuel system of claim 4 wherein the separating of the supply fuel into a first and second fuel is characterized by the equation:

$$\frac{\text{First Fuel Aromatic Content}}{\text{First Fuel Non-Aromatic Content}} = ASF \times \frac{\text{Supply Fuel Aromatic Content}}{\text{Supply Fuel Non-Aromatic Content}}$$

where ASF ranges from about 1.2 to about 8.5.

7. The fuel system of claim 1 wherein said second fuel contains less than about 80% of the aromatics of the supply fuel.

8. The fuel system of claim 6 wherein said first fuel contains greater than about 55 vol % aromatics.

9. The fuel system of claim 1 wherein said first fuel has a burn rate greater than iso octane.

10. The fuel system of claim 1 further including means for admixing the first and second fuel to obtain a third fuel having a RON and aromatics content between that of the first and second fuel, and means of supplying the third fuel to the engines.

11. A method for operating a vehicle having a spark ignition engine to increase the efficiency and reduce the emissions of the engine under conditions of use comprising:
  supplying a fuel to a fuel separation means;
  separating said fuel into a least first and second fuel;
  supplying at least a first fuel to the engine at about high engine load conditions; and
  supplying at least a second fuel to the engine at about low engine load conditions,
  the first fuel having a RON greater than 98;
  the second fuel having a RON less than about one RON below the supply fuel, and
  whereby engine efficiency is increased and emissions are reduced.

* * * * *